(12) United States Patent
Pappas

(10) Patent No.: US 7,129,931 B2
(45) Date of Patent: Oct. 31, 2006

(54) MULTIPURPOSE COMPUTER DISPLAY SYSTEM

(76) Inventor: Nicholas J. Pappas, 32 Sturges Commons, Westport, CT (US) 06880

( * ) Notice: Subject to any disclaimer, the term of this patent is extended or adjusted under 35 U.S.C. 154(b) by 0 days.

(21) Appl. No.: 09/952,138

(22) Filed: Sep. 14, 2001

(65) Prior Publication Data
US 2003/0052857 A1    Mar. 20, 2003

(51) Int. Cl.
G09G 5/00 (2006.01)

(52) U.S. Cl. .............................. 345/168; 361/681

(58) Field of Classification Search ............... 345/168, 345/169, 156; 361/680–683, 686, 68
See application file for complete search history.

(56) References Cited

U.S. PATENT DOCUMENTS

| | | | |
|---|---|---|---|
| 4,749,364 A | 6/1988 | Arney et al. | |
| 5,016,849 A * | 5/1991 | Wu ............................. | 361/681 |
| 5,168,423 A * | 12/1992 | Ohgami et al. ............. | 361/681 |
| 5,206,790 A * | 4/1993 | Thomas et al. ............. | 361/681 |
| 5,229,921 A | 7/1993 | Böhmer | |
| 5,335,142 A * | 8/1994 | Anderson .................... | 361/681 |
| 5,390,075 A | 2/1995 | English et al. | |
| 5,581,440 A | 12/1996 | Toedter | |
| 5,638,096 A * | 6/1997 | Schwartz .................. | 248/442.2 |
| 5,708,840 A * | 1/1998 | Kikinis et al. ............... | 708/105 |
| 5,745,340 A | 4/1998 | Landau | |
| 5,751,548 A | 5/1998 | Hall et al. | |
| 5,793,606 A | 8/1998 | Cubbage et al. | |
| 5,796,576 A | 8/1998 | Kim | |
| 5,796,577 A | 8/1998 | Ouchi et al. | |
| 5,805,415 A | 9/1998 | Tran et al. | |
| 5,808,862 A | 9/1998 | Robbins | |
| 5,831,696 A | 11/1998 | Sheng | |
| 5,854,735 A | 12/1998 | Cheng | |
| 5,870,280 A | 2/1999 | Cho | |
| 5,872,606 A | 2/1999 | Kim | |
| 5,873,554 A | 2/1999 | Nobuchi | |
| 5,900,848 A | 5/1999 | Haneda et al. | |
| 5,901,035 A | 5/1999 | Foster et al. | |
| 5,905,550 A | 5/1999 | Ohgami et al. | |
| 5,923,528 A | 7/1999 | Lee | |
| 5,926,237 A | 7/1999 | Yun et al. | |

(Continued)

FOREIGN PATENT DOCUMENTS

DE    19950006    4/2001

(Continued)

Primary Examiner—Regina Liang
(74) Attorney, Agent, or Firm—McCarter & English, LLP (57) ABSTRACT

A computer system is provided that allows a computer user to easily and effectively maximize the value and utility of the computer system's display screen. In a preferred embodiment, a laptop computer system includes a keyboard unit that includes a computer keyboard mounted to (or within) a system base. A flat-panel display is pivotally mounted relative to the system base, i.e., the back wall thereof. The flat panel display provides a display screen for displaying computer-generated images. An advantageous mounting assembly is provided proximate the back wall of the system base to join the flat panel display to the system base and permit rotational and pivotal motion of the flat panel display relative to the system base. A receiver or port for use in connecting the laptop computer's processor to an ancillary processing system is advantageously provided proximate a front wall of the system base. Rotational motion of the flat panel display relative to the system base permits repositioning of the flat panel display to facilitate optimal viewing by the user, either independent of or in combination with the aforementioned pivotal motion. In further preferred embodiments, the display screen is detachable and may be mounted on a system stand.

17 Claims, 8 Drawing Sheets

U.S. PATENT DOCUMENTS

| | | | |
|---|---|---|---|
| 5,926,364 A | 7/1999 | Karidis | |
| 5,927,997 A | 7/1999 | Ruland et al. | |
| 5,931,764 A | 8/1999 | Freeman et al. | |
| 5,936,609 A | 8/1999 | Matsuoka et al. | |
| 5,941,615 A | 8/1999 | Ito et al. | |
| 5,949,565 A | 9/1999 | Ishida | |
| 5,949,642 A | 9/1999 | Park | |
| 5,949,643 A | 9/1999 | Batio | |
| 5,953,205 A | 9/1999 | Kambayashi et al. | |
| 5,978,211 A | 11/1999 | Hong | |
| 5,982,429 A | 11/1999 | Kamamoto et al. | |
| 6,118,663 A | 9/2000 | Fan | |
| 6,151,207 A * | 11/2000 | Kim | 361/681 |
| 6,317,315 B1 * | 11/2001 | Lee et al. | 361/681 |
| 6,392,871 B1 * | 5/2002 | Yanase | 361/681 |
| 6,392,873 B1 * | 5/2002 | Honda | 361/681 |
| 6,498,721 B1 * | 12/2002 | Kim | 361/681 |
| 2001/0022719 A1 | 9/2001 | Armitage et al. | |
| 2001/0048584 A1 | 12/2001 | Rosen | |
| 2002/0015282 A1 | 2/2002 | Bang | |
| 2002/0024506 A1 * | 2/2002 | Flack et al. | 345/169 |
| 2002/0109962 A1 * | 8/2002 | Tseng et al. | 361/681 |

FOREIGN PATENT DOCUMENTS

| | | |
|---|---|---|
| EP | 0834792 | 9/1997 |

* cited by examiner

MULTIPURPOSE COMPUTER DISPLAY SYSTEM

BACKGROUND OF THE DISCLOSURE

1. Technical Field

The present disclosure relates to a computer display system that provides improved versatility and functionality, and more particularly to a computer display system that is advantageously rotatable and/or detachable relative to a keyboard-containing base, thereby providing a highly cost effective and efficacious computer display system.

2. Background Art

In the rapidly evolving computer products industry, significant increases in processing power, storage capacity, and monitor quality have continued to fuel increased adoption and ubiquitous use of computer technology. Beyond the desktop computers that are found in most homes and offices, portable laptop and/or notebook computers have continued to gain market penetration and adoption. Key factors feeding the continued advent of laptop computers include improved energy usage/storage, reduced weight, increased processing speed, increased storage capacity, and improved monitor quality.

Laptop computer users frequently utilize their laptop as their primary and/or exclusive computer system. Other laptop computer users employ their laptop in parallel with a desktop computer. Such users typically coordinate operation of their laptop computer with their desktop computer by transferring files between the two systems, e.g., by copying or backing up files from one to the other, through floppy disk file transfers, and/or by direct file sharing through parallel port communications and enabling software program(s). Given the space/weight constraints associated with laptop computer design, the use of laptop computers generally entails less-than-ideal keyboard designs/layouts and reduced storage capacity relative to traditional desktop computer systems.

Personal digital assistants, palmtops, hand-held computers, electronic books, and pocket computers (collectively, "PDAs") have also grown in adoption and use. These handheld devices generally combine computing, telephone/fax, and networking features. A typical PDA can function as a cellular phone, fax sender, and personal organizer. Unlike portable computers, most PDAs began as pen-based systems, using a stylus rather than a keyboard for input, and utilizing handwriting recognition features. Some PDAs can also react to voice input by using voice recognition technologies. PDAs of today are generally available in either a stylus or keyboard version.

In utilizing both laptop and desktop computer systems, the quality, flexibility and operation of the monitor is of importance to the overall computer system functionality and desirability. Thus, efforts have been devoted to developing improved computer monitors that offer superior image quality and reliable operation. Recently, flat-panel monitors have been commercialized that offer significant advantages to users, e.g., reduced space requirements, improved aesthetic appearance (e.g., at the desktop), and excellent visual acuity. Laptop computers generally employ flat-panel monitors for reasons of necessity, given space/weight constraints and the desire to pivotally mount the monitor relative to the base/keyboard for system protection and portability. At present, flat-panel monitors are substantially more expensive than conventional CRT monitors of comparable size.

Development efforts have been devoted to increasing the flexibility of computer systems as they relate to operation and use of computer monitors. U.S. Pat. No. 5,978,211 to Hong describes a flat-panel monitor permanently affixed to a stand. The stand includes an interface circuit positioned therewithin for connecting the flat-panel monitor, e.g., a liquid crystal display (LCD), to the host computer system and power supply. A dual-axis hinge assembly is provided that includes a horizontal shaft that permits some degree of rotation about a vertical shaft in the stand. Similarly, U.S. Pat. No. 5,870,280 to Cho discloses a base for an LCD that includes a pivot assembly that cooperates with a rotary disc. The Cho pivot device can be inclined up and down, and rotated left and right to some degree. A further pivotal/rotatable mechanism for use with an LCD view finder of a video camera is described in U.S. Pat. No. 5,982,429 to Kamamoto et al.

To increase the flexibility associated with computer systems, efforts have also been devoted to facilitating detachability of certain components. Thus, U.S. Pat. No. 5,793,606 to Cubbage et al. describes an LCD that is detachable/removable from a portable computer system, and an associated stand assembly having particular applicability to presentation systems and/or applications. The LCD display is formed with a hinge that allows variable viewing angles, whether the LCD is attached or detached from the portable computer system. U.S. Pat. No. 5,805,415 to Tran et al. describes a notebook computer having a detachable display and an accessory stand to support the detached display that may include multiple arms to provide greater pivotal flexibility. A further detachable display unit is described by Kim in U.S. Pat. No. 5,796,576. A foldable display screen is disclosed in U.S. Pat. No. 5,926,364 to Karidis, which forms a viewing angle for the display screen atop the system's keyboard.

Despite efforts to date, computer users who desire to utilize a flat-panel display with their desktop computers have essentially one choice: purchase a flat-panel display that will be used exclusively with the desktop computer system, at substantial cost (and potential redundancy with his/her laptop computer). Prior art teachings allow a computer user to connect his/her laptop computer to his/her desktop computer system, using the output ports at the rear of the laptop or its external expansion unit ("docking station"), but for the limited purpose of using the desktop computer system's conventional CRT monitor and/or other external equipment. Prior art teachings have also suggested monitor detachability from laptop/notebook computer systems for specific and limited purposes, namely to allow: (i) better viewing of presentations running on the laptop/notebook computer; (ii) ergonomic viewing of the monitor while using the laptop/notebook computer, i.e., positioning of the monitor display with greater independence relative to the laptop/notebook computer's keyboard/central processing unit, or (iii) ease of maintenance of the monitor/screen. None of these options is desirable and/or addresses the range of issues confronting users of laptop/notebook computer systems, and an improved, efficient, cost effective system is needed.

SUMMARY OF THE DISCLOSURE

According to the present disclosure, an improved laptop computer system is provided that allows a computer user to easily and effectively maximize the value and utility of the laptop's flat-panel display. In a preferred embodiment of the present disclosure, the laptop computer system includes a keyboard unit that includes a computer keyboard mounted to (or within) a system base. A flat-panel display is pivotally mounted relative to the system base, i.e., the back wall thereof. The flat panel display provides a display screen for displaying computer-generated images.

According to a preferred embodiment of the present disclosure, an advantageous mounting assembly is provided proximate the back wall of the system base. The mounting assembly joins the flat panel display to the system base and permits both rotational and pivotal motion of the flat panel display relative to the system base. Pivotal motion facilitates closure of the laptop computer system, e.g., when not in use and/or being transported by the user, and angular/rotational repositioning of the flat panel display to provide optimal viewing by the user. Rotational motion of the flat panel display relative to the system base also permits repositioning of the flat panel display to facilitate optimal viewing by the user, either independent of or in combination with the aforementioned pivotal motion.

In a particularly preferred embodiment of the disclosed laptop computer system, an input receiver or port for use in connecting the laptop computer's processor to an ancillary processing system, e.g., a desktop computer system, a local area network (LAN), a wide area network (WAN), the Internet, or a further computer system, is positioned proximate a front wall of the system base. The input receiver may be positioned in the front wall of the system base (i.e., the wall that is parallel to the back wall relative to which the flat panel display pivots), or immediately adjacent such front wall, e.g., on a side wall in close proximity to such front wall. The input receiver is adapted to send and receive signals from an ancillary computer system, thus coupling the laptop computer system to such ancillary computer system, e.g., for file and/or program sharing and access. Signals provided by, from or via the ancillary computer system are effective to create or deliver a computer-generated image on or to the flat panel display.

In preferred embodiments of the present disclosure, conventional software drivers, memory resident programs, and/or other software implementations (e.g., hardware-embedded programs) may contribute to generation of images for display on the flat panel display. Such drivers, programs and/or implementations may be provided or reside in the ancillary computer system, system base and/or display screen.

Of particular note, the rotatability of the flat panel display relative to the system base facilitated by the mounting assembly permits the flat panel display to be oriented such that the image is displayed away from the unit's keyboard, i.e., as much as one hundred eighty degrees removed from its initial position when upwardly pivoted from its closed position. The input receiver positioned proximate the front wall of the system base permits efficient and non-encumbered coupling of the laptop computer to an ancillary computer system, e.g., a desktop computer and/or a PDA.

Thus, a flat panel display associated with a laptop computer according to the present disclosure may be easily and efficiently used in conjunction with an ancillary computer system, e.g., a desktop computer or PDA that does not include a monitor or includes a less costly/desirable monitor. The flat panel display may be pivoted relative to the system base in its "rotated" orientation, to provide optimal viewing by the user, e.g., when used to view images generated through interaction with a keyboard associated with the ancillary computer system. The rotatability of the flat panel display in combination with the advantageous positioning of the input receiver(s) permits efficient, cost-effective use of the flat panel display acquired as part of the laptop computer system.

In a further preferred embodiment of the present disclosure, a laptop computer system is provided that includes a keyboard unit that includes a computer keyboard mounted to (or within) a system base. A flat-panel display for displaying computer-generated images is pivotally mounted relative to the system base, i.e., the back wall thereof. An advantageous mounting assembly is provided proximate the back wall of the system base that joins the flat panel display to the system base. The mounting assembly permits both rotational and pivotal motion of the flat panel display relative to the system base, and permits the flat panel display to be detached from the system base by the user. Once detached from the system base, the flat panel display may be mounted in a stand, wherein rotational and pivotal motions are accommodated, and wherein interaction with ancillary computer system(s), e.g., a desktop computer or PDA, is facilitated. According to the present disclosure, advantageous kit(s) may be provided that include necessary structures and components to implement detached use and operation. The detachability of the flat panel display from the system base further increases the flexibility, utility and cost effectiveness of a laptop computer system according to the present disclosure.

Numerous other advantages, features and structural aspects of the present disclosure will become apparent from the following detailed description, the accompanying drawings and from the claims appended hereto.

BRIEF DESCRIPTION OF THE DRAWINGS

So that those having ordinary skill in the art to which the subject matter of the present disclosure appertains will more readily understand how to construct and use computer system(s) of the present disclosure, reference may be had to the following drawings and the accompanying detailed description, wherein.

DETAILED DESCRIPTION OF PREFERRED EMBODIMENT(S)

While the present disclosure is susceptible of embodiments in many different forms, there are shown in the drawings and will be described in detail herein specific embodiments thereof with the intention that such embodiments of the present disclosure are to be considered as exemplifications of the principles of the disclosed invention, and are not intended to limit the invention to the specifically disclosed and illustrated embodiments. For example, although not depicted in the figures provided herewith, it is contemplated that "touch screens" may be utilized according to the present disclosure to facilitate interaction with the computer systems described herein, as would be readily apparent to persons skilled in the art based on the present disclosure. It is further contemplated that advantageous computer display system(s) as described herein may be beneficially employed in conjunction with personal digital assistants, palmtops, hand-held computers and pocket computers. Additional alternative embodiments of the present disclosure will likewise be readily apparent to those of skill in the art, such alternative embodiments falling within the spirit and scope of the present disclosure.

Figure 1:
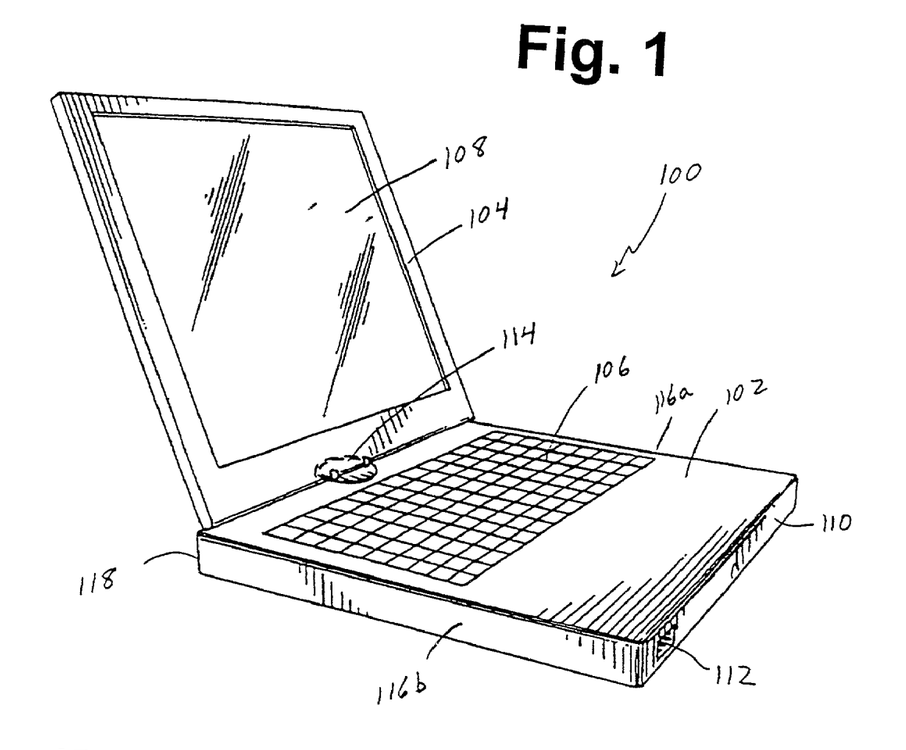
FIG. 1 is a perspective view of a laptop computer according to the present disclosure.
Figure 2:
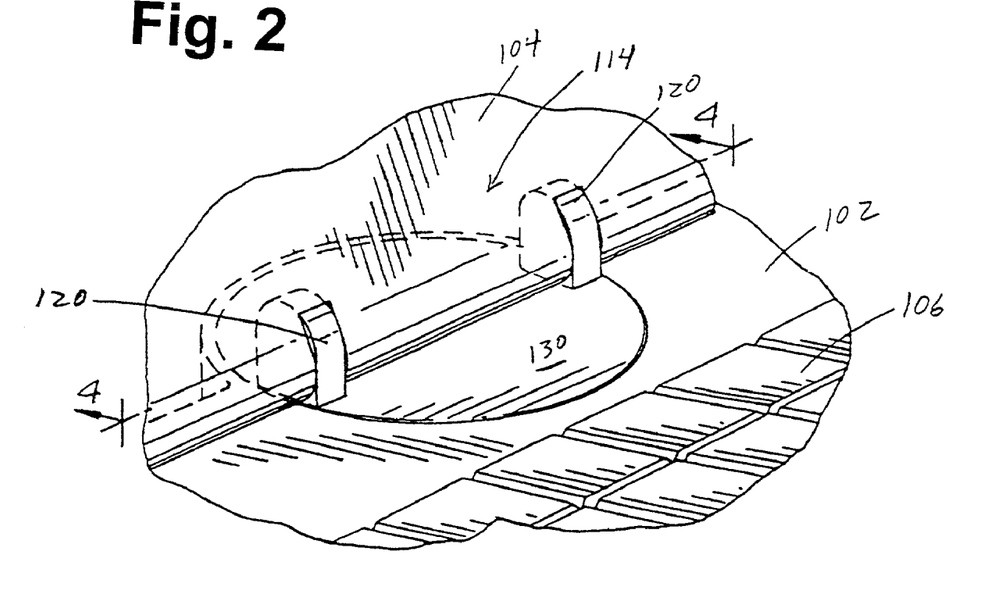
FIG. 2 is a partial breakaway view of a mounting assembly according to a first embodiment of the present disclosure.

With reference to FIG. 1, a laptop computer 100 according to one aspect of the present disclosure is depicted. Laptop computer 100 includes a system base or keyboard unit 102 and a display monitor 104 mounted relative thereto. The system base 102 is substantially rectangular in shape and includes a front wall 110, side walls 116a, 116b, and a rear wall 118. A keyboard 106 is positioned within system base 102, as is known in the art. Keyboard 106 typically includes QWERTY keys and conventional "mouse" technology, e.g., a mouse ball, touch pad, pointer or the like. As depicted in FIG. 1, keyboard 106 is substantially flush with the top surface of system base 102; however, it is contemplated according to the present disclosure that any keyboard system and/or design may be advantageously employed in realizing the substantial benefits described hereinafter.

System base 102 typically contains conventional componentry for operation of laptop computer 100. Thus, a battery unit is typically provided, e.g., a lithium-ion battery. A slot may also be provided in side wall 116a or 116b to receive a secondary battery to extend battery time/life. Additional components that may be included within or as part of laptop computer include an audio controller, built-in modem, video controller, built-in speaker, fan and/or random access memory ("RAM"). RAM and/or single in-line memory modules ("SIMMs") are generally designed to fit into specialized slots defined in system base 102 and, therefore, off-the-shelf RAM and SIMMs are generally not utilized in construction laptop computer systems.

Laptop computer 100 may also include a floppy disk drive, CD-ROM drive and/or DVD-ROM drive, e.g., in side wall 116a and/or 116b. Such drive systems may be combined into a single component, or separated into individual components that take turns utilizing a drive bay positioned within system base 102. A PC card slot is typically provided in system base 102 to facilitate addition of other peripheral componentry. A PC can serve the functions of a hard drive, modem, network connection, or connection to an external drive, e.g., a CD-ROM drive. Multiple PC card slots may be provided in system base 102 to further expand the flexibility associated with laptop computer 100.

To facilitate communication with external components, a series of ports and/or jacks are typically provided in system base 102. For example, a headphone jack may be provided to allow users to obtain better sound quality than is generally available from built-in speakers. With further reference to FIG. 1, a port or jack 112 is advantageously positioned in front wall 110 according to the present disclosure. Port 112 generally constitutes a 15 pin D-sub video connector, serial port, parallel port and/or universal serial bus ("USB"), and may communicate with peripheral devices by wired communication or wireless communication (e.g., via infrared signals), thereby facilitating connection and/or communication of laptop computer 100 with ancillary data/processing unit(s), e.g., to a desktop computer output port or a docking station through which laptop computer 100 can access a desktop keyboard, mouse, hard drive and/or printer. Port 112 may be advantageously connected to a VGA output port from a desktop computer's video card, e.g., by way of a 15 pin D-sub signal cable.

According to preferred embodiments of the present disclosure, port 112 is particularly adapted for video signal transmissions, and may advantageously take the form of a VGA 15 pin D-sub or an IEEE 1394 port (e.g., FireWire® product available from Apple Computer, Inc., Cupertino, Calif.), e.g., for input of video signals to laptop computer 100. It is further contemplated that multiple ports may be advantageously provided in connection with laptop computer systems according to the present disclosure, e.g., to facilitate multiple and/or various inputs thereto. Thus, the present disclosure is to be specifically understood to encompass laptop computer systems that include multiple, adjacent ports for transmission to and/or from such laptop computer system. For non-wireless port embodiments, port 112 generally connects to an ancillary data/processing unit by way of a conventional cable (not pictured) or the like.

In addition, according to preferred embodiments of the present disclosure, port 112 is advantageously positioned in or at the front wall 110 of system base 102.

As shown in FIG. 1, exemplary port 112 is depicted closer to side wall 116b than to side wall 116a. However, it is contemplated that port 112 may be advantageously at or substantially near the center of front wall 110, thereby advantageously positioning wires/cables that cooperate with port 112 in a relatively non-obtrusive location. It is also contemplated that port 112 may be advantageously positioned in close proximity to front wall 110, e.g., on or at side walls 116a, 116b, provided such side wall positioning is in close proximity to front wall 110. As used herein, "close proximity" refers to positioning that is substantially closer to front wall 110 than to rear wall 118.

With further reference to FIG. 1, display monitor 104 includes a display screen 108 for displaying images generated by or through laptop computer 100. Display monitor 104 typically employs a liquid crystal display ("LCD") for the screen, eliminating the bulkiness of conventional desktop cathode ray tube monitors. The LCD display is generally backlit by a panel that shines light through the LCDs toward the user. The generation of images for display on display screen 108 may arise from a processing unit (not pictured) mounted within system base 102, ancillary drive(s) connected to laptop computer 100, and/or ancillary data/processing systems communicating with laptop computer 100 by way of port 112. Conventional software drivers, memory resident programs, and/or other software implementations (e.g., hardware-embedded programs) may be provided to assist in and/or contribute to generation of images for display on panel screen 108. Such drivers, programs and/or implementations may be provided or reside in the ancillary computer system, system base 102 and/or display screen 108. Keyboard 106 may also be used to input and/or manipulate images displayed on display screen 108, as is known in the art.

Figure 3:
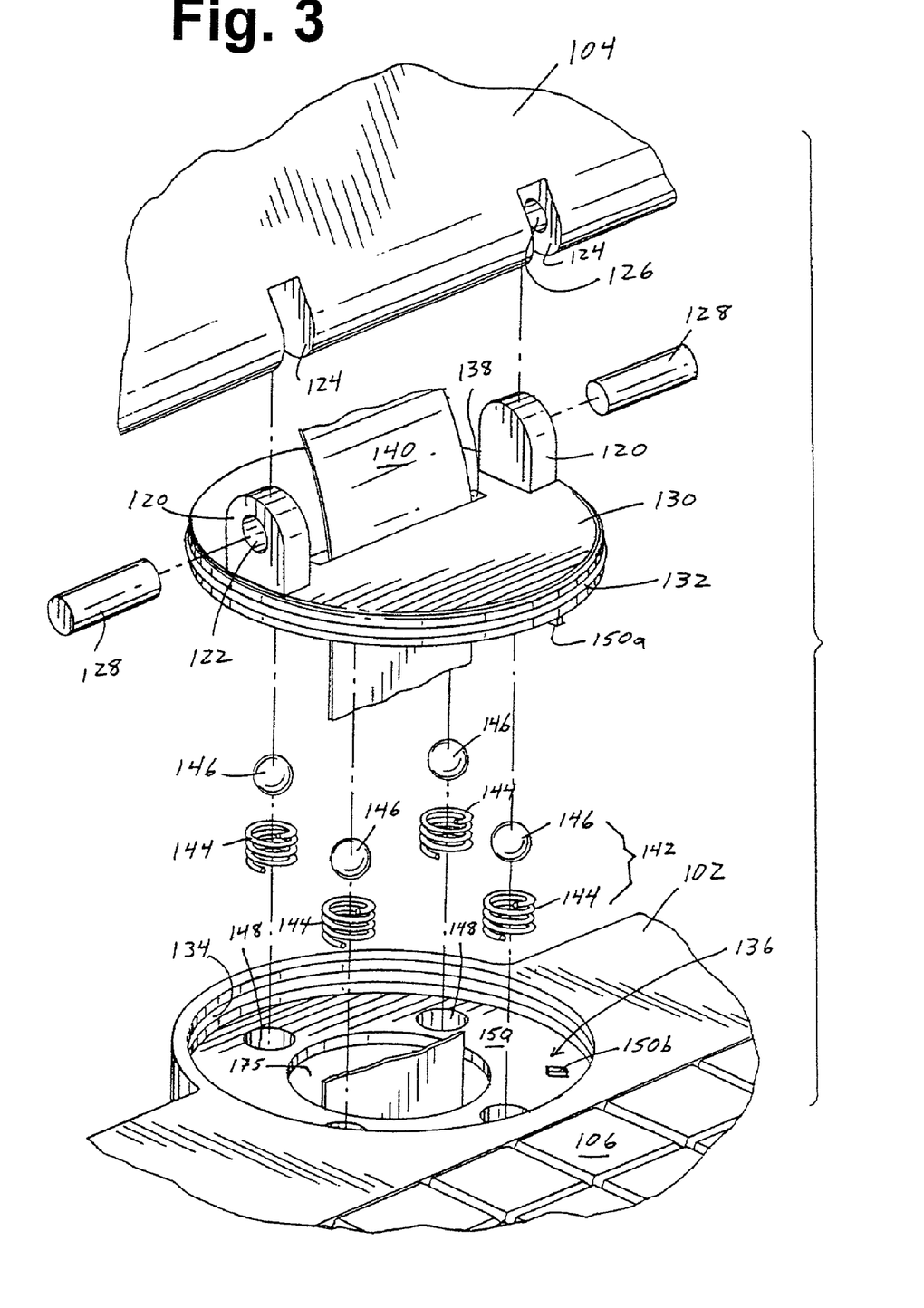
FIG. 3 is a partial exploded view of the mounting assembly of FIG. 2.
Figure 4:
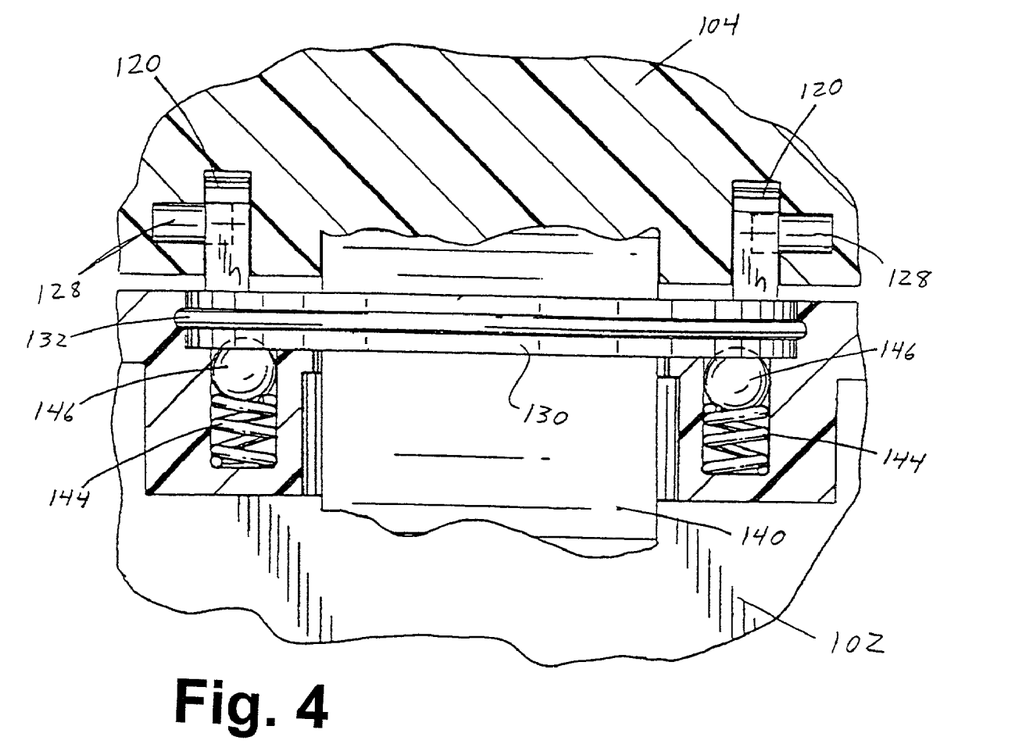
FIG. 4 is a partial sectional view of the mounting assembly of FIG. 2.
Figure 5:
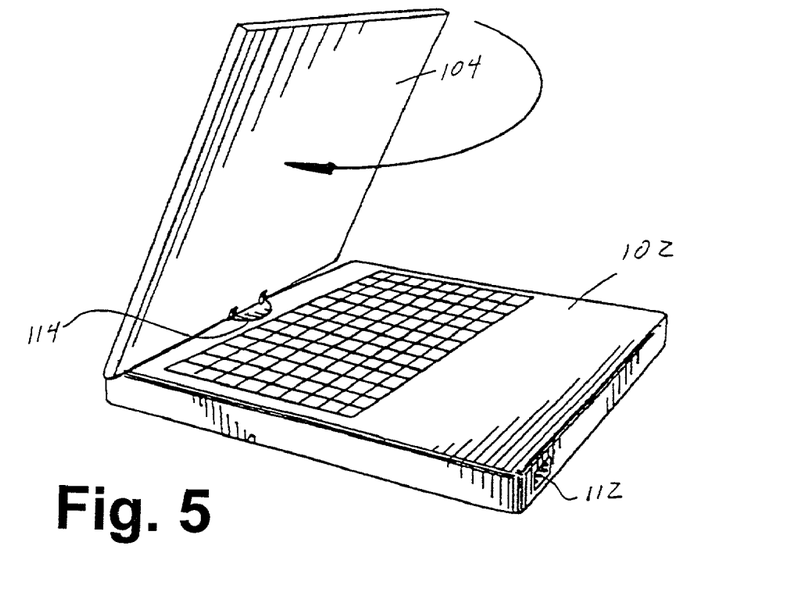
FIG. 5 is a further perspective view of the laptop computer of FIG. 1.

With reference to FIGS. 1–5, a preferred mounting mechanism for movably mounting display monitor 104 relative to system base 102 will now be described. Mounting assembly 114 permits dual motion of display monitor 104 relative to system base 102, namely pivotal motion and rotational motion, i.e., rotatability. Thus, display monitor 104 is permitted to pivot into an overlying position relative to system base 102, e.g., when it is desired to close laptop computer 100 for protection, transport or the like. In such overlying arrangement, display monitor 104 and system base 102 are substantially coplanar. Through the rotational motion facilitated by mounting assembly 114, display monitor 104 may be rotated such that display screen 108 is directed away from front wall 110 of system base 102 (as shown in FIG. 5), i.e., rotation of approximately 180 degrees relative to the orientation depicted in FIG. 1.

With particular reference to FIGS. 3 and 4, mounting assembly 114 includes a pair of spaced mounting brackets 120 protruding from a substantially circular turret 130. Each of the mounting brackets 120 includes an outwardly directed cavity 122. Brackets 120 are dimensioned to fit within slots 124 formed in display monitor 104 such that relative motion between brackets 120 and display monitor 104 is permitted. Channels 126 are formed in display monitor 104 and open into slots 124. Rods 128 are inserted through channels 126 and into cavities 122, providing an axis about which display monitor 104 may pivot relative to system base 102. Once inserted, rods 128 are generally not visible to users of laptop computer 100. A lubricant may be employed on rods 128 and/or within channels 126 to facilitate pivotal motion of display monitor 104, as described herein.

Turret 130 includes a circumferential rim 132 that is dimensioned to mate within a channel 134 formed in circular opening 136 formed in system base 102. A central slot 138 is also formed in turret 130 to permit passage of conduit 140, i.e., appropriate transmission means to facilitate delivery to and rendering of computer-generated images by display screen 108. Conduit 140 extends between display monitor 104 and the processing unit within system base 102, as is known in the art.

To facilitate rotation of turret 130 relative to system base 102, spring-loaded ball bearings 142 are positioned therebetween. Each spring-loaded ball bearing 142 includes a compression spring 144 and a ball 146. Compression springs 144 are positioned within and extend from cylindrical chambers 148. Bearings 142 are preferably equidistantly spaced relative to turret 130. Thus, in the preferred embodiment depicted in FIGS. 3 and 4, four bearings 142 are equidistantly spaced relative to each other and relative to the center of turret 130.

As depicted in FIGS. 4 and 5, compression springs 144 are nested within chambers 148 and bias balls 146 into engagement with the underside of turret 130. Such spring biasing maintains turret 130 spaced away from base 150 defined by circular opening 136. Thus, bearings 142 facilitate rotation of turret 130 and display monitor 104 (which is pivotally mounted to turret 130 through interaction of rods 128, channels 126 and brackets 120) relative to system base 102, and permit display screen 108 to be oriented as desired by the user. Indeed, the dual motion of display monitor 104 relative to system base 102 that is accommodated according to the present disclosure provides optimal flexibility, versatility and functionality to users of laptop computer 100. The rotatability of turret 130 relative to system base 102 is generally limited by the malleability of conduit 140, and stops 150*a*, 150*b* (shown in FIG. 3) cooperate to advantageously limit the rotational motion of turret 130, e.g., to no greater than 180 degrees in either direction. Multiple sets of stops 150*a*, 150*b* may be provided that are associated with and/or depend from turret 130 and base 150 to further delimit the rotatability of turret 130 relative to base 150. Moreover, the design and/or interaction of cooperating stops 150*a*, 150*b* may assume a variety of configurations, as will be readily apparent to persons skilled in the art.

Of particular significance according to the present disclosure, the combination of (i) positioning port 112 on (or in close proximity to) the front wall 110 of system base 102, and (ii) facilitating rotation of display monitor 104 relative to system base 102 through mounting assembly 114, provides significant benefits to users of laptop computer 100. A user may advantageously couple laptop computer 100 with an ancillary computer system, e.g., a desktop computer, by coupling the ancillary computer system to laptop computer 100 via port 112 positioned at the front of system base 102. The user may also rotate display monitor 104 relative to system base 102 such that display screen 108 is oriented away from keyboard 106, i.e., rotated 180 degrees relative to the initial position depicted in FIG. 1.

In this way, a user may advantageously view computer-generated images on display screen 108 while using an ancillary computer system, e.g., a desktop computer's keyboard, data files, application programs, connectivity, etc. The user may thus benefit from the high quality, slim profile of display monitor 104 while using hardware and software resources associated with an ancillary computer system. Indeed, the need to acquire a monitor for the ancillary computer system may be obviated. In a particularly preferred embodiment of the present disclosure, the user may orient system base 102 away from his/her seated position, i.e., toward the back of a desk, while rotating display screen 108 to face him/her, thereby significantly enhancing the visibility and convenience associated with viewing display screen 108. Cabling associated with coupling the ancillary computer system to laptop computer 100 will be spaced away from the user, and advantageously hidden from view by display monitor 104, due to the positioning of port 112 in front wall 110. The user may pivot display monitor 104 to a desired angular orientation relative to system base 102, thereby further enhancing the functionality of display screen 108.

Turning to an alternative embodiment of the present disclosure, FIGS. 6–9 depict an exemplary laptop computer 200 according to the present disclosure that includes a detachable display monitor 204 having a display screen 208. System base or keyboard unit 202 includes a keyboard 206 and a port or jack 212 mounted in a front wall 210, in like manner to the laptop computer 100 described herein with reference to FIGS. 1–5. Display monitor 204 is pivotally mounted relative to system base 202, such that display monitor 204 can assume an overlying relationship such that display monitor 204 and system base 202 are substantially coplanar.

Figures 6, 7:
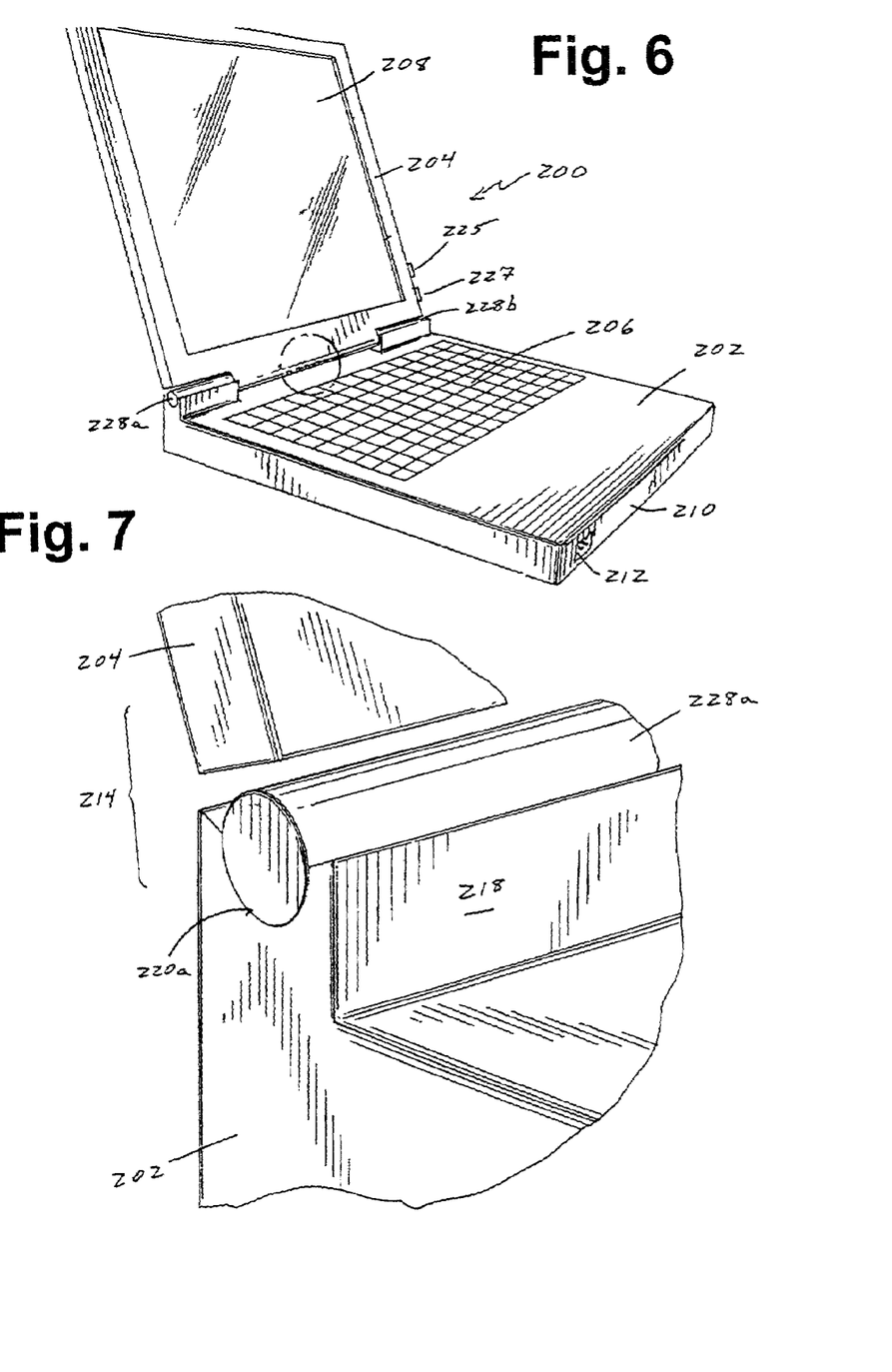
FIG. 6 is a perspective view of an alternative laptop computer according to the present disclosure.
FIG. 7 is a partial breakaway view of a structural aspect of the alternative laptop computer according to FIG. 6.

With reference to the exploded view of FIG. 7, a mounting mechanism 214 for detachably and pivotally mounting display monitor 204 relative to system base 202 includes rod 228*a* that extends from display monitor 204 and is positioned within arcuate cradle 220*a* formed in upstanding back wall 218 of system base 202. A corresponding rod 228*b*/cradle 220*b* are provided at the opposite side of system base 202, and cooperate with back wall 218 of system base 202. A variety of mechanisms for mounting rods 228*a*, 228*b* to display monitor 204 are contemplated, e.g., welding, press fit, bolt mechanisms, bayonet locking systems, and the like. Ports 225, 227 are provided on display monitor 204 for supplying power to display monitor 204 and communicating data for display thereon, e.g., from a processor contained within system base 202 and/or an ancillary data/processing unit(s). Ports 225, 227 may be combined into a single port, e.g., for use with a USB connector having power wires contained therewithin. In addition, port 227 may facilitate wireless communications, e.g., utilizing infrared energy transmissions. According to preferred embodiments of the present disclosure, port 225 and/or port 227 is/are particularly adapted for video signal transmissions, and may advantageously take the form of a VGA 15 pin D-sub or an IEEE 1394 port (e.g., FireWire® product, Apple Corporation, Cupertino, Calif.), e.g., for input of video signals to laptop computer 200.

Figure 8:
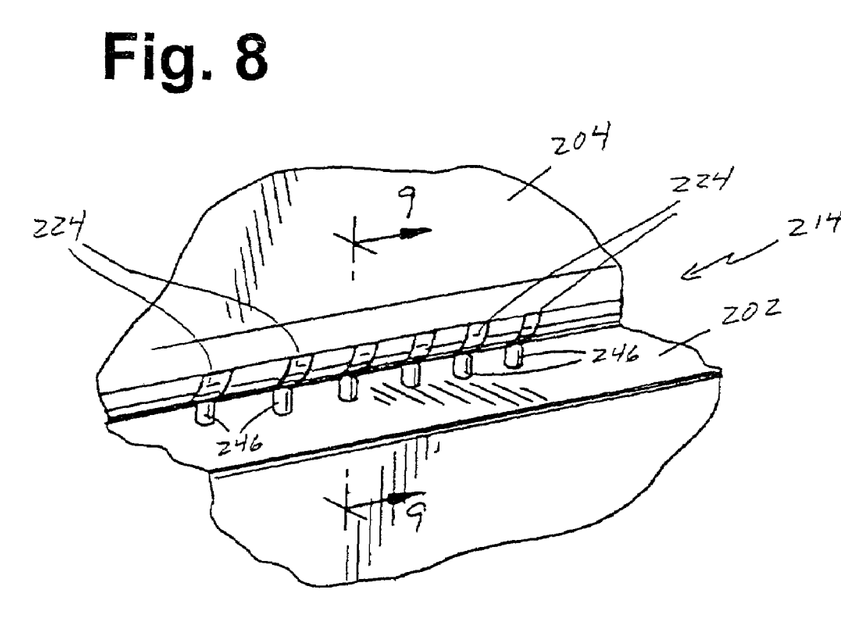
FIG. 8 is a partial breakaway view of a mounting assembly according to the alternative embodiment of FIG. 6.
Figure 9:
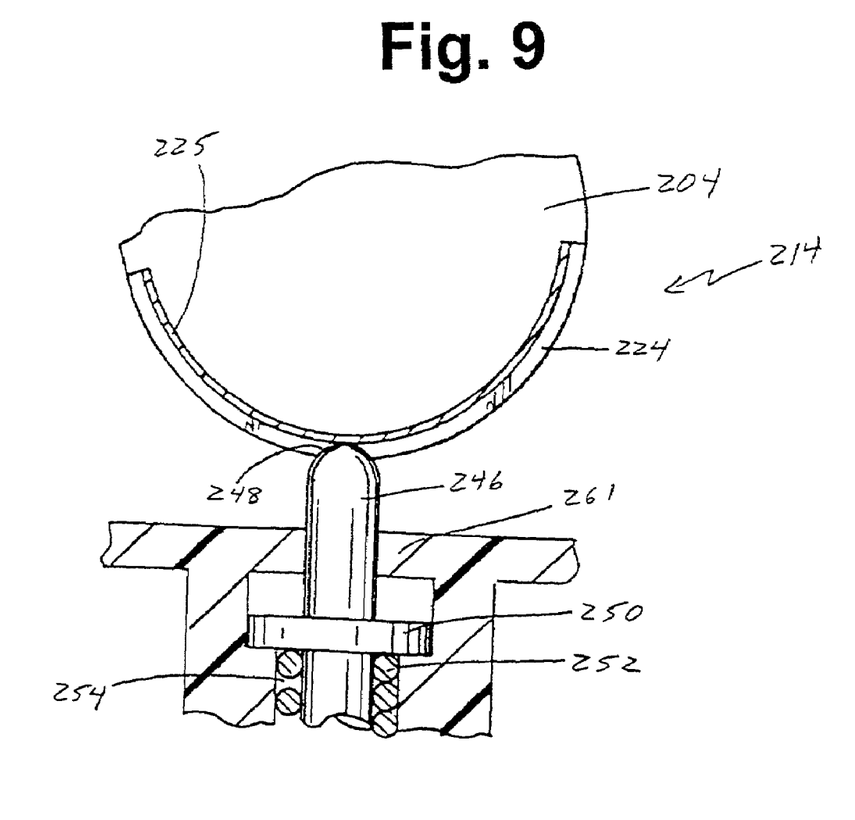
FIG. 9 is a partial sectional view of the mounting assembly of FIG. 8, taken along line 9—9.

Turning to FIGS. 8 and 9, detachable and pivotal mounting of display monitor 204 relative to system base 202 is further effectuated through a plurality of spring-loaded extension arms 246 that extend from system base 202. Extension arms 246 are spaced relative to each other and are dimensioned and configured to fit within correspondingly spaced arcuate slots 224 formed in display monitor 204, thereby preventing display monitor 204 from laterally sliding off of system base 202 (e.g., through sliding of rods 228a, 228b relative to cradles 220a, 220b. Arcuate slots 224 are of sufficient length to permit a desired level of travel for display monitor 204 relative to system base 202. Thus, the interplay between extension arms 246 and arcuate slots 224 is such that display monitor 204 advantageously pivots between a plurality of upright positions and an overlying relationship to system base 202, i.e., when laptop computer 200 is closed. Arcuate slots 224 generally traverse an angular distance of about 180°.

In exemplary embodiments of the present disclosure, each extension arm 204 includes a semi-spherical face 248 that rides within a corresponding arcuate slot 224 and an abutment flange 250. A compression spring 252 is captured within a cavity 254 and abuts the abutment flange 250 at one end and the base of cavity 254 within system base (not pictured) at the other end. Thus, compression spring 252 biases extension arm 246 into engagement with face 225 within arcuate slot 224. Abutment flange 250 is further captured within cavity 254 by the top face 261 of system base 202.

When display monitor 204 is detached from system base 202, as described herein, compression spring 252 forces abutment flange 250 into engagement with top face 261 of system base 202. Conversely, when a detached display monitor 204 is returned to engagement with system base 202, the interaction of extension arms 246 with arcuate slots 224 brings display monitor 202 into desirable alignment with system base 202. Simultaneously, rods 228a, 228b nest within cradles 220a, 220b. Of note, base on the symmetry of extension arms 246/arcuate slots 224 and rods 228a, 228b/cradles 220a, 220b, display monitor 202 may be advantageously oriented in an opposite direction relative to system base 202, i.e., with display screen 208 directed away from keyboard 206. Thus, significant flexibility and enhanced utility are achieved through advantageous mounting mechanisms according to exemplary embodiments of the present disclosure.

Figure 10:
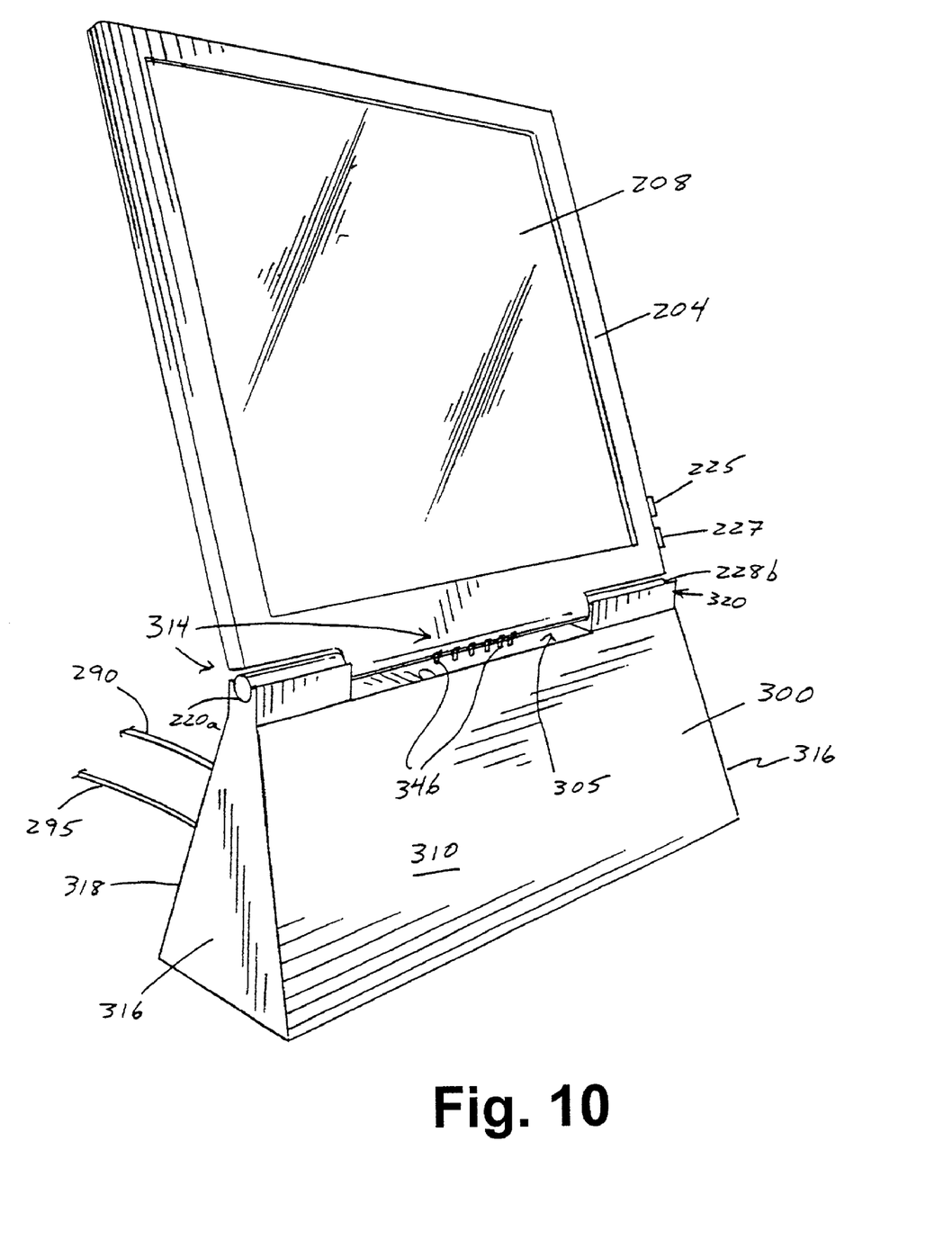
FIG. 10 is a perspective view of a detached flat panel display mounted in a stand according to an embodiment of the present disclosure.

Turning to FIG. 10, an exemplary system stand 300 is depicted for use with a detachable display monitor 204 according to the present disclosure. System stand 300 includes substantially triangular side walls 316 and rectangular front and back walls 310, 318. Although the exemplary embodiment of FIG. 10 includes triangular side walls 316, such geometry is not critical to the design and/or functionality of systems according to the present disclosure and, indeed, alternative geometries, e.g., square, rectangular, trapezoidal and the like, are contemplated. System stand 300 also typically replicates, at least in part, the mounting mechanism 214 described with reference to laptop computer 200. Thus, exemplary system stand 300 typically includes a mounting mechanism 314 that includes cradles 320 for receiving rods 228a, 228b of display monitor 204. A plurality of spring-biased extension arms 346 advantageously extend from system stand 300 in intermediate region 305 defined between cradles 320. The number and spacing of extension arms 346 generally corresponds to the corresponding extension arms 246 associated with system base 202. When detachably mounted on system stand 300, display monitor 204 is pivotal with respect thereto, thereby providing a user an opportunity to orient display screen, as desired.

Exemplary cables 290 and 295 are shown extending away from the rear of system stand 300. Cables 290 may be used to transmit power to port 225 of display monitor 204, and cable 295 may transmit information/data for display on display monitor 204. Of note, system base 202, system stand 300 and detachable display monitor 204 provide a cost effective, reliable computer system that enhances the utility and flexibility associated with each individual component. Thus, in preferred embodiments of the present disclosure, a kit that includes a system base, system stand and a detachable display monitor are provided to supply such enhanced flexibility and utility.

Of further note with respect to the present disclosure, decorative and/or distinctive aesthetic features may be advantageously incorporated into the design and/or fabrication of the system stand, system base and/or display monitor to further enhance the desirability of the disclosed systems. Thus, it is contemplated that distinctive wood finishes, e.g., mahogany, cherry, oak and the like, metal finishes and/or trims, e.g., gold-plating, or other distinctive detailing may be added thereto. Such aesthetic features may be useful to enhance the overall appearance of the computer system components according to the present disclosure, and to create an aesthetic and/or ornamental connection between individual system components.

Additional exemplary embodiments are contemplated according to the present disclosure. Thus, for example, with reference to FIGS. 6–10, it is contemplated that rods 228a, 228b may be one continuous rod extending substantially the full length of display monitor 204. Cradles 220 and/or cradles 320 may also be extended in like measure to correspond to the extended rods, and extension arms may be spring-biased to extend from cradles 220, 320 into engagement with angular slots 224 formed in the elongated rods. Alternative alignment means are also contemplated for use in place of spring-loaded extension arms 246, 346, e.g., fixed projections, raised surfaces or nubs.

With reference to system stand 300, it is contemplated that ports and/or jacks may be provided in one or more faces thereof, e.g., front and/or back wall 310, 318, to receive appropriate connections with respect to display monitor 204. Thus, system stand 300 may advantageously function as a USB host for interaction of USB devices associated with display monitor 204. It is further contemplated that a variety of mounting mechanisms may be employed to detachably mount a display monitor with a system base and/or system stand for pivotal motion with respect thereto according to the present disclosure. Thus, for example, a plurality of spaced, arcuate hooks may extend from the bottom of display monitor that are adapted to engage corresponding apertures formed in the system base and/or system stand. The arcuate hooks may advantageously snap into the apertures, and be manually released, as desired by a user, e.g., by pushing a button on the side of the system base and/or system stand that frees the arcuate hooks for removal from such apertures.

In a further preferred embodiment of the present disclosure, it is contemplated that the rotatable and pivotal interaction of display monitor 104 with system base 102 be achieved using a mounting mechanism that permits detachment of display monitor 104 therefrom, e.g., as shown with reference to FIGS. 6–9. Thus, for example, it is contemplated that turret 130 may detachably engage system base 102, e.g., by way of a plurality of downwardly extending hooked extension arms that extend through the central opening 175 formed in base 150. The extension arms would not inhibit rotational motion of turret 130 relative to system base 102, but would facilitate disengagement of display monitor 104 therefrom, and reengagement with a second structural support, e.g., a system stand similar in construction to that depicted in FIG. 10.

Thus, in preferred embodiments of the present disclosure, a display monitor is provided that is pivotally and rotatably mounted with respect to a system base. Alternatively, a display monitor is provided that is pivotally and detachably mounted with respect to a system base. And, in a further embodiment, a display monitor is provided that is pivotally, rotatably and detachably mounted with respect to a system base. Display monitors according to the present disclosure are advantageously adapted to interact with multiple processing units and/or ancillary computer system(s), e.g., one or more laptop computers, one or more desktop computers, one or more PDAs, and combinations thereof. Through advantageous positioning of port(s) associated with the system base of a laptop computer, display monitors according to the present disclosure may be conveniently utilized in conjunction with a desktop computer by rotating the display monitor by 180° and utilizing port(s) located on the "front face" of the system base. In this way, cabling is kept out of the way relative to the rotated display monitor. Kits and systems are provided according to preferred embodiments of the present disclosure that offer users ancillary structures, e.g., system stand(s), that facilitate full implementation of the disclosed benefits and advantages.

Figure 11A:
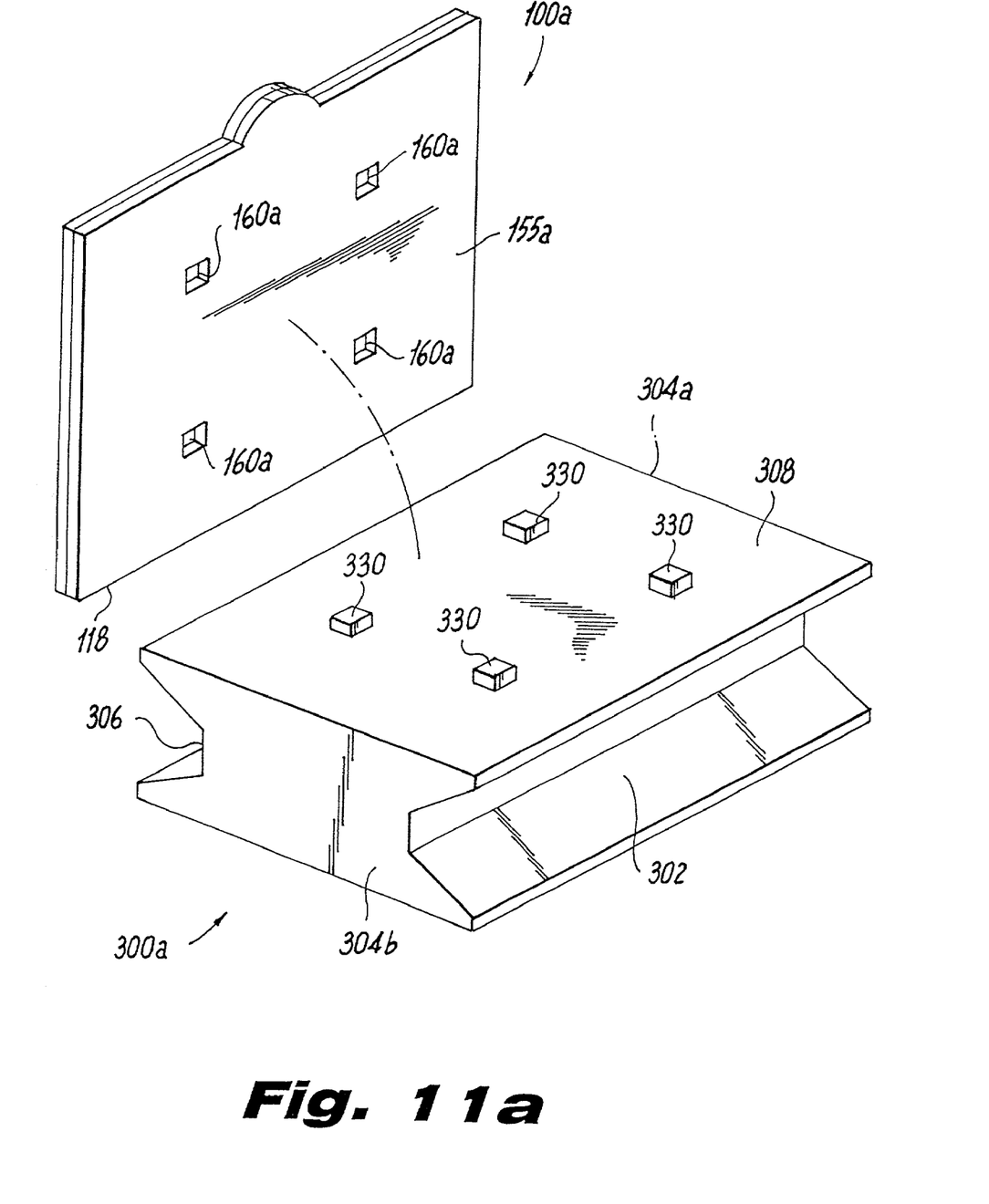
FIGS. 11a and 11b are exploded perspective views of further alternative embodiments of laptop computer and stand systems according to the present disclosure.

With reference to FIGS. 11a and 11b, further advantageous systems for use of exemplary laptop computer 100 are shown. In the exemplary embodiment of FIG. 11a, laptop computer 100a includes a plurality of spaced recesses 160a formed in the underside 155a thereof. Spaced recesses 160a are preferably equally spaced on the underside 155a such that laptop computer 100a may be oriented on laptop stand 300a securely and in multiple positions. A laptop stand 300a for cooperative interaction with laptop computer 100a is advantageously provided pursuant to the embodiment of FIG. 11a. Laptop stand 300a is substantially rectangular in outer dimension and includes a front wall 302, side walls 304a, 304b and rear wall 306. In addition, in the exemplary embodiment of FIG. 11a, laptop stand 300a includes a substantially rectangular top surface 308 that includes a plurality of spaced protrusions 330 extending therefrom. In the exemplary embodiment of FIG. 11a, spaced recesses 160a and four spaced protrusions 330 are provided. Spaced protrusions 310 are sized and positioned so as to cooperate with recesses 160a, thereby stabilizing laptop computer 100a relative to laptop stand 300a.

The symmetric positioning of recesses 160a on underside 155a and protrusions 330 on top surface 308 permit laptop computer 100a to be positioned such that the laptop monitor will face "toward" or "away" from the user when removably mounted on laptop stand 300a. Moreover, through rotatable mounting of the display monitor relative to the keyboard unit, the directional orientation of the display monitor may be adjusted without removing laptop computer 100a from laptop stand 300a.

In the pictured embodiment, front wall 302, side walls 304a, 304b, and rear wall 306 define inwardly directed or concave parabolic surfaces relative to top surface 308 and base 312. Such concavity provides a visually/aesthetically desirable appearance to laptop stand 300a (and to laptop computer 700a when removably mounted thereon). Alternative geometries and surface features are contemplated and may be employed in connection with laptop stand 300a, as will be apparent to persons skilled in the art. In addition, decorative and/or distinctive aesthetic features may be advantageously incorporated into the design and/or fabrication of the laptop stand 300a. For example, distinctive wood finishes, e.g., mahogany, cherry, oak and the like, metal finishes and/or trims, e.g., gold-plating, or other distinctive detailing may be added thereto. In an exemplary computer system according to the present disclosure, at least one of the keyboard unit, the ancillary computer system, and the display screen includes a decorative treatment. Such aesthetic features may enhance the overall appearance of the computer system components and create an aesthetic and/or ornamental connection between individual system components.

Figure 11B:
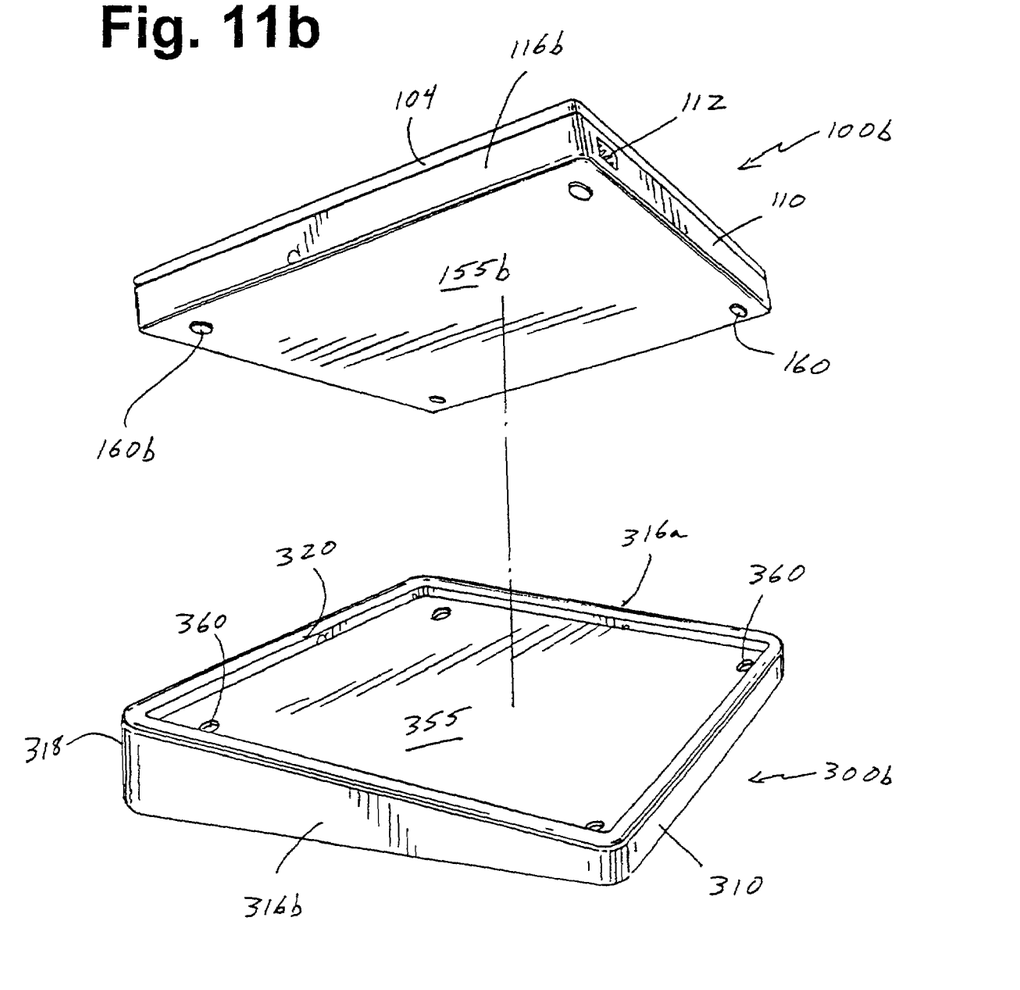

An alternative embodiment according to the present disclosure is depicted in FIG. 11b. Laptop computer 100b includes a plurality of protrusions or buttons 160b extending from the underside 155b thereof. In the exemplary depicted embodiment of FIG. 11b, laptop computer 100b includes four equally spaced protrusions 160b positioned adjacent respective corners of underside 155b. Alternative numbers, geometries and relative positionings of spaced protrusions 160 are contemplated.

A laptop stand 300b for cooperative interaction with laptop computer 100b is provided pursuant to the embodiment of FIG. 11b. Laptop stand 300b is substantially square in outer dimension and includes a front wall 310, side walls 316a, 316b and raised rear wall 318. Laptop stand 300b includes a substantially square surface 355 that is bounded by a peripheral ridge 320. A plurality of spaced recesses 360 are formed in surface 355. Spaced recesses 360 are sized and positioned so as to cooperate with protrusions 160b, thereby stabilizing laptop computer 100b relative to laptop stand 300b. In the pictured embodiment, surface 355 is angularly oriented relative to a horizontal plane, to enhance interaction with the laptop's keyboard. Peripheral ridge 320 provides further stabilization to laptop computer 100b.

As noted above, decorative and/or distinctive aesthetic features may be advantageously incorporated into the design and/or fabrication of the laptop stand 300b. For example, distinctive wood finishes, e.g., mahogany, cherry, oak and the like, metal finishes and/or trims, e.g., gold-plating, or other distinctive detailing may be added thereto. In an exemplary computer system according to the present disclosure that includes a first system base, a second system base, a display screen and a system stand, at least one of the first system base, second system base, display screen and system stand may include a decorative treatment. Such aesthetic features may enhance the overall appearance of the computer system components and create an aesthetic and/or ornamental connection between individual system components.

While the present disclosure provides detailed descriptions with reference to preferred embodiments, it is to be understood that various modifications and changes may be made in the construction, arrangement and operation of the computer systems disclosed herein without departing from the spirit and scope of the invention as defined by the appended claims and reasonable equivalents thereof. While many modifications and variations are disclosed herein, other variations will become apparent to persons skilled in the art from the detailed description and drawings provided herewith, and are encompassed within the spirit and scope of the present disclosure.

The invention claimed is:

1. A computer system comprising:
   a) a keyboard unit including a computer keyboard and a keyboard base that includes a front wall and a back wall;
   b) a display screen for displaying computer-generated images, said display screen defining first and second side walls, a bottom edge that extends from the first side wall to the second side wall and two spaced slots formed in said bottom edge;
   c) a mounting assembly proximate said back wall of said keyboard base, said mounting assembly including two spaced mounting brackets extending upwardly from a rotatable element and configured and dimensioned to be received within said two spaced slots, said mounting assembly joining said display screen to said keyboard unit and permitting both rotational motion of said display screen relative to a first axis and pivotal motion of said display screen relative to a second axis that is perpendicular to said first axis; and
   d) a port positioned proximate said front wall of said keyboard base, said port adapted to receive a signal from an ancillary computer system;
   wherein a signal from said ancillary computer system delivered to said port is effective to generate a computer-generated image on said display screen; and
   wherein said bottom edge of said display screen defines an intermediate region between said pair of slots and wherein a communication conduit extends from said keyboard base directly into said intermediate region of said display screen.

2. A computer system according to claim 1, further comprising a central processing unit mounted within said keyboard unit.

3. A computer system according to claim 1, wherein said display screen is a flat screen unit.

4. A computer system according to claim 1, wherein said mounting assembly detachably joins said display screen to said keyboard base.

5. A computer system according to claim 4, further comprising a system stand, and wherein said display screen is detachable from said keyboard base and pivotally mountable in said system stand.

6. A computer system according to claim 1, wherein said mounting assembly permits angular motion of said display screen relative to said keyboard base of at least one hundred eighty degrees.

7. A computer system according to claim 6, wherein said mounting assembly includes spring-loaded alignment elements mounted in said keyboard base that cooperate with slots formed in said display screen.

8. A computer system according to claim 1, wherein said ancillary computer system is selected from the group consisting of a desktop computer, a personal digital assistant, a palmtop computer, a hand-held computer, an electronic book, and a pocket computer.

9. A computer system according to claim 1, further comprising at least one stop for limiting rotational motion of said display screen relative to said keyboard base.

10. A computer system according to claim 1, wherein said rotatable element of said mounting assembly defines a turret that is rotatable relative to a circular opening formed in said keyboard base.

11. A computer system according to claim 10, wherein said turret includes a circumferential rim for engaging a corresponding channel formed in said keyboard base.

12. A computer system according to claim 1, wherein at least one of said keyboard unit, said ancillary computer system, and said display screen includes a decorative treatment.

13. A computer system for enhancing the utility of a display screen, comprising:
    a) a first processing unit positioned within a first system base;
    b) a second processing unit positioned within a second system base; and
    c) a display screen for displaying computer-generated images, said display screen pivotally and rotatably mounted with respect to said first system base such that said display screen is configured for rotational motion relative to a first axis and for pivotal motion relative to a second axis that is perpendicular to said first axis, and
    wherein said display screen includes a bottom edge that defines two spaced slots and an intermediate region therebetween, and wherein said display screen is mounted with respect to a base that includes two mounting brackets that are configured and dimensioned to be received within said spaced slots; and
    wherein said display screen communicates with a port at least in part based on a communication conduit that extends from said base directly into said intermediate region of said display screen for selectively receiving informational transmissions from said first and second processing units.

14. A computer system according to claim 13, wherein said display screen is detachably mounted with respect to said first system base.

15. A computer system according to claim 14, further comprising a system stand, said display screen and said system stand configured and dimensioned for detachably mounting said display screen to said system stand.

16. A computer system according to claim 15, wherein at least one of said first system base, said second system base, said display screen and said system stand includes a decorative treatment.

17. A computer system according to claim 13, wherein said first processing unit, said first system base and said display screen define a laptop computer, and said second processing unit and said second system base define an ancillary computer system selected from the group consisting of a desktop computer, a personal digital assistant, a palmtop computer, a hand-held computer and a pocket computer.

* * * * *